UNITED STATES PATENT OFFICE.

ERIK GUSTAF NICOLAUS SALENIUS, OF STOCKHOLM, SWEDEN.

METHOD OF PRODUCING CHEESE CURDS IN A CONTINUOUS MANNER.

SPECIFICATION forming part of Letters Patent No. 526,165, dated September 18, 1894.

Application filed May 23,1892. Serial No. 434,024. (No specimens.) Patented in Sweden October 19,1891, No. 4,510; in Germany May 10, 1892, No. 65,532; in France July 20, 1892, No. 223,125; in England July 26, 1892, No. 13,641; in Norway July 26, 1892, No. 2,866; in Belgium August 16, 1892, No. 101,033; in Canada September 14, 1892, No. 40,332, and in Finland February 20,1894, No. 499.

*To all whom it may concern:*

Be it known that I, ERIK GUSTAF NICOLAUS SALENIUS, a subject of the King of Sweden and Norway, and a resident of Stockholm, Sweden, have invented certain Improvements in Methods of Producing Cheese Curds or Cheese in a Continuous Manner, (for which patents have been granted to me in Sweden, No. 4,510, dated October 19, 1891; in Germany, No. 65,532, dated May 10, 1892; in Belgium, No. 101,033, dated August 16,1892; in Canada, No. 40,332, dated September 14,1892; in Norway, No. 2,866, dated July 26, 1892; in England, No.13,641, dated July 26,1892; in France, No. 223,125, dated July 20, 1892, and in Finland, No. 499, dated February 20, 1894,) of which the following is a specification.

This invention relates to the production of cheese curds or cheese from any liquid suited to the production of the same, as milk, skimmed milk, cream, or skimmed milk mixed with an emulsion of fat. The process is carried on in a continuous manner and affords notable advantages in respect of economy of time, and cost of heating and stirring the milk. The apparatus for the preparation of the cheese is also much simplified.

The characteristic features of my method over those which have been proposed heretofore are these: I carry on the process in a continuous manner, whereby there is a continuous production of the cheese mass, and I lead into the centrifugal apparatus the milk and curdling agent simultaneously or substantially so, in such a manner that the precipitation of the cheese mass is effected in the apparatus and substantially simultaneously with the separation by centrifugal action. The manner of proceeding will vary somewhat with the character of the particular liquid employed, but where the liquid contains fat in any considerable degree, as in preparing rich or fat cheese, the process will be essentially as follows: The liquid is qualified with extract of rennet, or some other acid suitable for curdling it, and led at once in a continuous manner into the rapidly rotating drum of some form of centrifugal apparatus or continuous churn, wherein, during the separating process, it is stirred or agitated. The liquid will be brought to or maintained at the proper temperature, either by heating or cooling it, and this may be done before its introduction into the apparatus, or at the time it is introduced. The caseine contained in the liquid qualified with rennet or acid is precipitated during the stirring and if the apparatus employed be a centrifugal apparatus the caseine will be simultaneously separated from the whey and the latter, being the heavier, will be thrown outward to the circumference of the circumscribing drum wall while the caseine or curd will remain nearer the drum axis. The two constituents being thus separated may be separately discharged or skimmed out from the apparatus by known methods. The qualifying of the liquid with rennet or acid may be effected immediately before the liquid is led into the apparatus or simultaneously therewith; that is, the curdling agent may be added continuously as the liquid is led into the apparatus; or this agent may be continuously added to the liquid in the apparatus during the stirring of the liquid. While the rennet, or curdling agent may be added to the milk just before the latter is admitted to the centrifugal apparatus, it will be understood that I do not curdle the milk before its introduction to the drum, but in the drum and during the agitation and separation of the whey from the cheese mass. The actual addition of the curdling agent to the milk, whether it be just before the milk enters the drum, or simultaneously therewith, or a moment after its entry, is not important, but I prefer to mix them simultaneously with their admission to the drum. The curdling, the agitation, and the separation take place nearly or substantially simultaneously, and they take place continuously. The stirring or agitation of the liquid is the more important where the liquid contains a considerable proportion of fat and during the time it is subjected to centrifugal action; but if the liquid contains very little fat, as when making lean or meager cheese, the stirring is less essential and may even be wholly dispensed with. The effect and object of the stirring is to prevent the formation of large clots or masses, and to prevent also the incarceration of whey in the cheese mass. To effect the stirring or agitation of the liquid any suitable means or devices may be employed. For example, a continuous churn may be used wherein the liquid is stirred by jets of liquid, or by means of beating, substantially as described in British Patent No. 21,068 of 1890; or the beating may be performed in a continuous but not revolving churn; or the stirring may be effected as the liquid is leaving the centrifugal apparatus by causing the liquid to be thrown against obstacles to its flow. If the skimming is effected with a curved skimming pipe this pipe may be provided with such obstacles. As stated, the proper temperature must be given to the liquid and maintained, and this may be effected by heating or cooling it, as the circumstances may require, before leading it into the apparatus, or its temperature can be properly modified while it is being led into the apparatus, or after it has been led into the apparatus. Together with the addition of the curdling agent, and while the liquid is under treatment in the apparatus, cheese coloring matters or ingredients for producing different kinds of cheese may be added, which may be effected by dropping or continuous streaming of the substance into the liquid. The curds or the mixture thus obtained may be treated as usual in preparing cheese either as it leaves the apparatus separated from the whey, or mixed in some proportion with the same.

I wish it understood that I do not claim broadly forming a curd by primary coagulation of the milk and then, as an after process, placing said curd in a centrifugal apparatus and separating the whey therefrom. In carrying out my process there is a continuous admission of the uncoagulated milk, a continuous process of coagulation in the drum, and a continuous removal of the separated curd and whey.

Having thus described my invention, I claim—

1. The herein described method of producing cheese curds or cheese, which consists in leading a liquid containing caseine, in a continuous manner into a centrifugal apparatus or churn and at the same time leading a curdling agent in a continuous manner into the same apparatus, wherein the caseine is coagulated and the curd is separated from the whey, and removing said curd and whey in a continuous manner.

2. The herein described method of producing cheese curds or cheese, which consists in leading a liquid containing caseine, in a continuous manner into a centrifugal apparatus or churn and at the same time leading a curdling agent in a continuous manner into the same apparatus, stirring the liquid during the operation, and removing the curd and whey in a continuous manner.

3. The herein described method of producing cheese curds or cheese, which consists in leading a liquid containing caseine, in a continuous manner into a centrifugal apparatus or churn and at the same time leading a curdling agent and extracts and matters used in the preparation of cheese, in a continuous manner into the same apparatus, stirring the liquid during the operation, and removing the cheese mass and whey in a continuous manner.

4. The herein described method of producing cheese curds or cheese, which consists in leading a liquid containing caseine, a curdling agent and extracts and matters used in preparation of cheese, simultaneously in a continuous manner into a centrifugal apparatus or churn, stirring the liquid during the operation and removing the cheese mass and whey in a continuous manner.

5. The herein described method of producing cheese curds, which consists in subjecting a liquid, containing caseine and mixed with a curdling agent and extracts and matters used in the preparation of cheese, to centrifugal action and agitation, whereby the curd is separated from the whey, and then removing the curd and whey, the operation being performed in a continuous manner, as set forth.

In witness whereof I have hereunto signed my name in the presence of two subscribing witnesses.

ERIK GUSTAF NICOLAUS SALENIUS.

Witnesses:
ERNST SVANVIRST,
CARL CECTELL.